US008214135B2

(12) United States Patent
Nevin et al.

(10) Patent No.: US 8,214,135 B2
(45) Date of Patent: Jul. 3, 2012

(54) PARTICULATE FILTER ASH LOADING PREDICTION METHOD AND VEHICLE USING SAME

(75) Inventors: Ryan Nevin, Waterloo, IA (US); Antonio Triana, Waterloo, IA (US); Danan Dou, Cedar Falls, IA (US); Taner Tuken, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 92 days.

(21) Appl. No.: 12/896,044

(22) Filed: Oct. 1, 2010

(65) Prior Publication Data

US 2012/0083990 A1 Apr. 5, 2012

(51) Int. Cl.
*G06F 19/00* (2011.01)
*F01N 3/023* (2006.01)

(52) U.S. Cl. ............... 701/114; 60/277; 60/295; 60/311

(58) Field of Classification Search .................. 701/101, 701/102, 114; 60/274, 277, 295, 297, 311; 73/114.69, 114.75

See application file for complete search history.

(56) References Cited

U.S. PATENT DOCUMENTS

| | | | | |
|---|---|---|---|---|
| 4,833,883 | A * | 5/1989 | Oda et al. | 60/311 |
| 6,367,246 | B1 * | 4/2002 | Hirota et al. | 60/295 |
| 6,622,480 | B2 | 9/2003 | Tashiro et al. | |
| 7,404,291 | B2 * | 7/2008 | Endo | 60/277 |
| 7,581,389 | B2 * | 9/2009 | Crawley et al. | 60/295 |
| 7,685,811 | B2 * | 3/2010 | Taylor et al. | 60/277 |
| 7,723,257 | B2 * | 5/2010 | Bosteels | 423/213.2 |
| 2007/0251214 | A1 | 11/2007 | Nishino et al. | |
| 2008/0104948 | A1 * | 5/2008 | Kapparos et al. | 60/295 |
| 2010/0043408 | A1 * | 2/2010 | Girot et al. | 60/295 |
| 2011/0131951 | A1 * | 6/2011 | Arrigoni et al. | 60/311 |
| 2011/0138775 | A1 * | 6/2011 | Arrigoni et al. | 60/295 |

FOREIGN PATENT DOCUMENTS

JP 06026327 A * 2/1994

* cited by examiner

*Primary Examiner* — Willis Wolfe, Jr.
(74) *Attorney, Agent, or Firm* — Taylor IP, P.C.

(57) ABSTRACT

A particulate filter ash loading prediction method including the steps of determining a maximum average time for the filter; performing a calculation of a running average of time between regenerations of the filter; calculating an end-of-service life ratio of the filter dependent upon the maximum average time and the running average. The method further includes the steps of determining a delta pressure adjustment factor to compensate for ash loading of the filter depending upon the end-of-service life ratio; and comparing the delta pressure adjustment factor to a predetermined maximum delta pressure value, and, if the delta pressure adjustment factor exceeds the predetermined maximum normalized delta pressure adjustment factor, then indicating that a service or replacement of the filter is needed due to the ash loading.

20 Claims, 3 Drawing Sheets

PARTICULATE FILTER ASH LOADING PREDICTION METHOD AND VEHICLE USING SAME

FIELD OF THE INVENTION

The present invention relates to the field of internal combustion engines, and, more particularly, to internal combustion engines having exhaust aftertreatment devices.

BACKGROUND OF THE INVENTION

Internal combustion engines come in a number of forms, the most common of which are spark-ignited gasoline fueled engines and compression-ignition, diesel-fueled engines. The compression-ignition, or diesel-type engine is used in many commercial and industrial power applications because its durability and fuel economy are superior to the spark-ignited gasoline-fueled engines. A diesel engine utilizes the heat of the compression of the intake air, into which a timed and metered quantity of fuel is injected, to produce combustion. The nature of the diesel engine cycle is that it has a variable air-fuel ratio that can, under partial power conditions, rise to levels significantly above stoichiometric. This results in enhanced fuel economy since only the quantity of fuel needed for a particular power level is supplied to the engine.

One of the issues with a diesel-type engine is the impact on emissions. In addition to the generation of carbon monoxide and nitrous oxide, there is a generation of particulates in the form of soot. A number of approaches are employed to reduce particulates while, at the same time, reducing oxides of nitrogen to ever more stringent levels as mandated by government regulations. Stoichiometric engines have been proposed to achieve this balance since they enable the use of an automotive type catalyst to reduce oxides of nitrogen. By operating the engine at or near stoichiometric conditions, a three-way catalyst may be utilized. However, operation in this manner causes a substantial increase in diesel particulates. Accordingly, a particulate filter (PF) in the form of a diesel particulate filter (DPF) must be employed to filter out the particulates, but the generation of particulates in a significant amount require that frequent regeneration of the filters, through temporary heating or other means, is necessary to remove the collected particulate matter. A wall-flow DPF will often remove 85% or more of the soot during operation. Cleaning the DPF includes utilizing a method to burn off the accumulated particulate either through the use of a catalyst or through an active technology, such as a fuel-burner, which heats the DPF to a level in which the soot will combust. This may be accomplished by an engine modification which causes the exhaust gasses to rise to the appropriate temperature. This, or other methods, known as filter regeneration, is utilized repeatedly over the life of the filter. One item that limits the life of the DPF is an accumulation of ash therein that will cause the filter to require replacement or some other servicing, such as a cleaning method, to remove the accumulated ash. The accumulated ash causes a reduction in the efficiency of the DPF and causes increased back pressure in the exhaust system of the diesel engine system.

U.S. Patent Application Pub. No. US 2007/0251214 discloses an apparatus for detecting a state of a DPF with a differential pressure sensor. An electronic control unit estimates an amount of ash remaining in the DPF based on the output of the differential pressure sensor immediately after the regeneration process. Alternatively, the residue ash amount may be calculated based on the difference between a ratio of the variation rate of the input manifold pressure with the variation rate of the differential pressure immediately after the regeneration process and an equivalent ratio regarding a thoroughly new or almost new diesel particulate filter. The residue ash amount is calculated every time a regeneration process is carried out and stored in memory. This method is problematic since the backpressure assessment after regeneration can be misleading if the soot has not been entirely removed and since the backpressure due to the ash accumulation measured after each regeneration can vary leading to misleading assumptions about the ash content.

U.S. Pat. No. 6,622,480 discloses a DPF unit and regeneration control method that adjusts the start timing of a regeneration operation. The method includes an estimate of the ash accumulated quantity that is in the exhaust gas and accumulated in the filter and the correction of the exhaust pressure judgment value for judging the regeneration operation start based on the ash accumulated estimation value. The ash quantity is determined from the quantity of lubricant oil consumed according to the engine operation state. The effective accumulation in the filter with ash is reflected in the judgment of regeneration start timing because the exhaust pressure judgment value to be used for judging the regeneration operation start is corrected with the ash accumulation estimation value. The use of oil consumption is problematic since the lubricant oil may be consumed in ways other than being combusted. Further, even if the oil is not combusted, it is not necessarily passed through the DPF.

It is also possible that direct-injected gasoline engines may require the use of a PF in the future, as a result of ever increasing governmental emissions standards.

What is needed in the art is a system that maximizes the life of a PF, such as a DPF, while ensuring that the regeneration process is done in an efficient, economical manner.

SUMMARY

In one form, the invention includes a particulate filter ash loading prediction method including the steps of determining a maximum average time for the filter; performing a calculation of a running average of time between regenerations of the filter; calculating an end-of-service life ratio of the filter dependent upon the maximum average time and the running average. The method further includes the steps of determining a delta pressure adjustment factor to compensate for ash loading of the filter depending upon the end-of-service life ratio; and comparing the delta pressure adjustment factor to a predetermined maximum delta pressure value, and, if the delta pressure adjustment factor exceeds the predetermined maximum normalized delta pressure adjustment factor, then indicating that a service or replacement of the filter is needed due to the ash loading.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION

Figure 1:
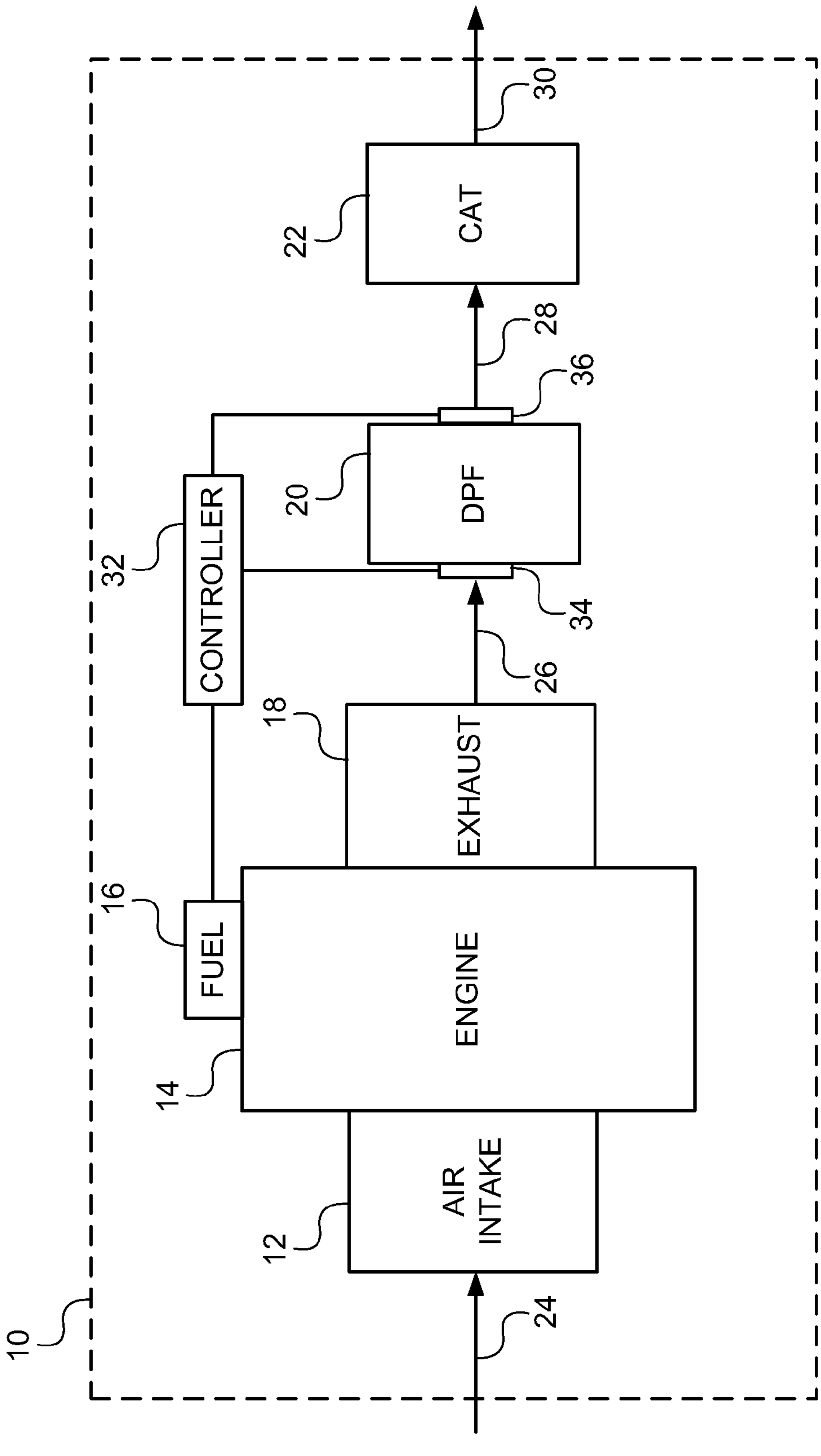
FIG. 1 is a schematic drawing of a vehicle with an internal combustion engine employing an embodiment of an ash loading prediction method of the present invention.

Referring now to the drawings, and more particularly to FIG. 1, there is shown a vehicle 10, which may be an agricultural work vehicle, a forestry work vehicle or a construction type vehicle utilizing an engine system that includes an air intake 12, an engine 14, a fuel supply system 16 (labeled FUEL in FIG. 1), and an exhaust system 18 (labeled EXHAUST in FIG. 1). Engine 14 has at least one piston reciprocating within an engine block that is connected to a crankshaft for producing a rotary output (not shown). Each piston is movable within a variable volume combustion chamber that receives air for combustion from air intake 12 and fuel from fuel supply system 16. The products of combustion pass through exhaust system 18.

The engine system additionally includes a diesel particulate filter (DPF) 20 (labeled DPF in FIG. 1) and a catalyst 22 (labeled CAT in FIG. 1). Although the embodiment of the invention illustrated in the drawings and described herein is with reference to a diesel engine having a DPF, it is understood that the present invention can likewise apply to other types of engines using a PF, such as a direct-injected gasoline engine, etc. An air intake flow 24 passes into engine 14 for the purposes of combustion, having an exhaust flow 26 that passes through DPF 20 and a gas flow 28 that continues through catalyst 22 and is exhausted in the form of gas flow 30 to the environment. DPF 20 and catalyst 22 may be combined into one unit or catalyst 22 may be positioned at a different location or omitted from the engine system. A controller 32 interacts with sensors 34 and 36 as well as fuel supply system 16 to control the flow of fuel and to sense the pressure drop across DPF 20. DPF 20 may be regenerated as directed by controller 32 with input of the sensors 34 and 36, each of which provide pressure readings so that the pressure drop across DPF 20 can be calculated by controller 32 based on the difference in pressure measurements between sensors 34 and 36. Controller 32 provides input to fuel supply system 16, which may cause engine 14 to change the exhaust temperature flowing through exhaust system 18 to DPF 20, causing a regeneration of DPF 20.

Figure 2A:
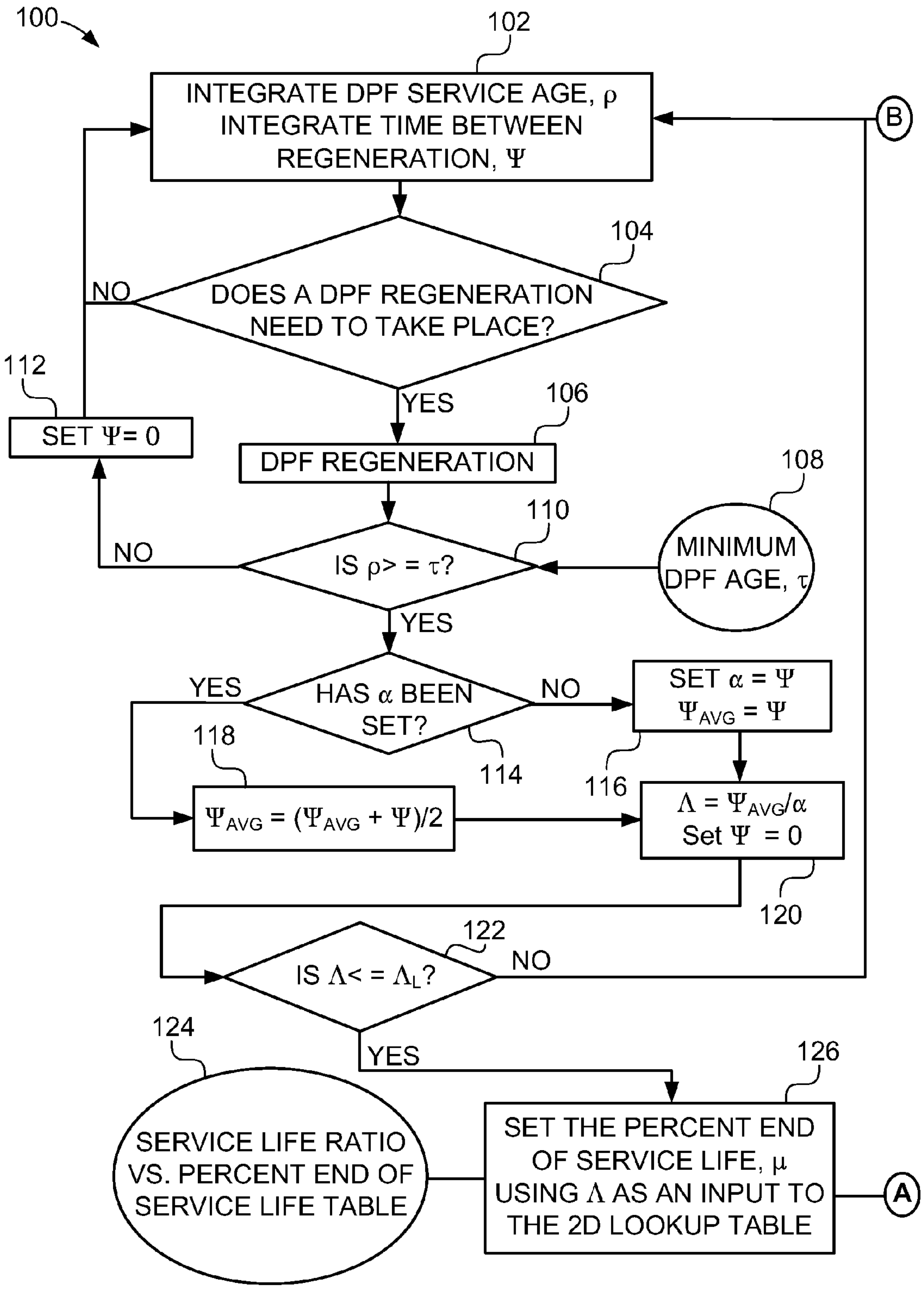
FIGS. 2A and 2B depict a schematical representation of the method utilized in the vehicle of FIG. 1.
Figure 2B:
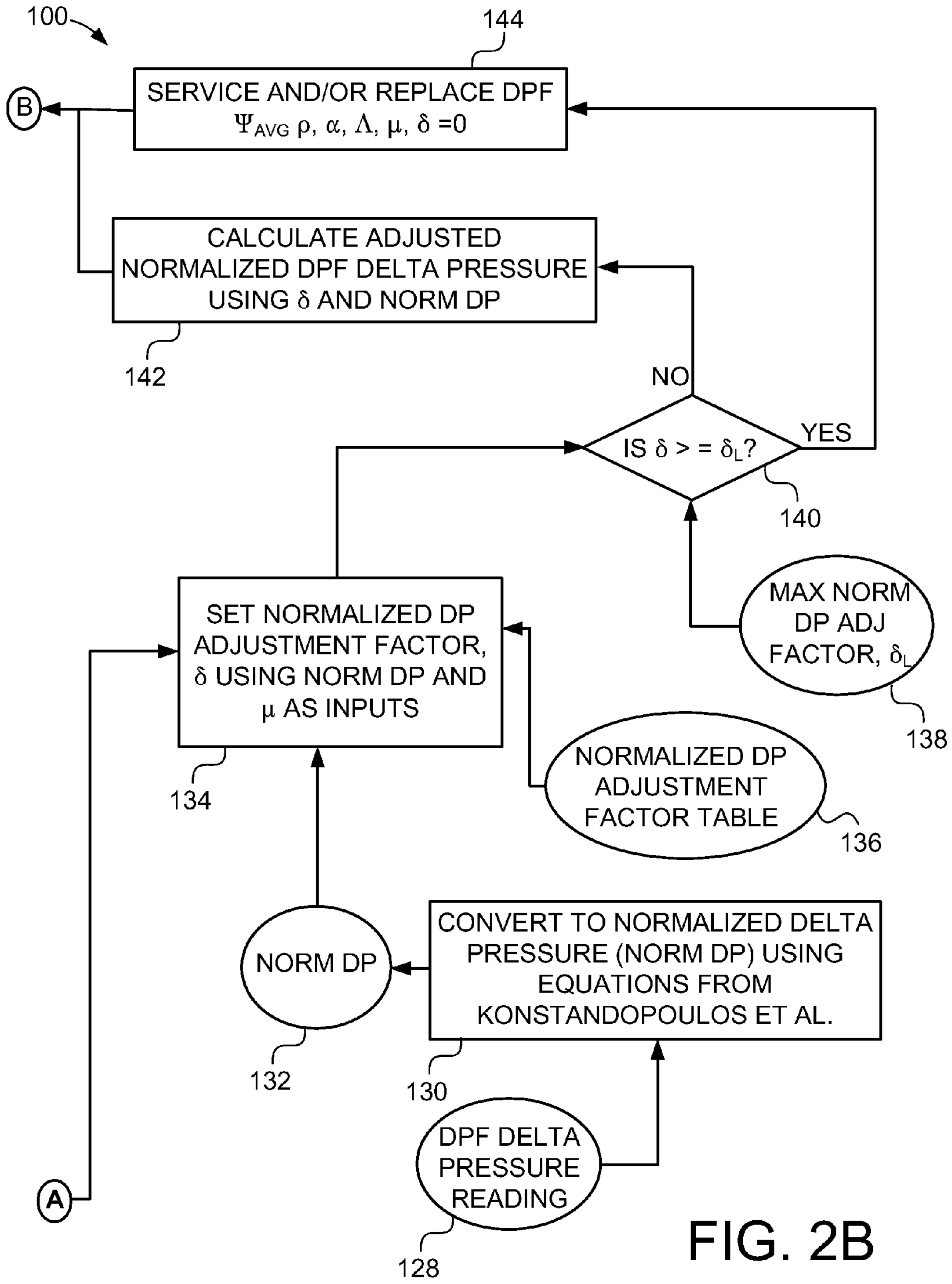

Now, additionally referring to FIGS. 2A and 2B, there is shown an ash loading prediction method 100 utilized within controller 32, which may be interconnected to other sensors and control systems. Controller 32 may have other functions unrelated or indirectly related to the functions of method 100 of the present invention. Method 100 includes a step 102 in which the DPF service age $\rho$, as well as the time between regenerations $\Psi$ are separately integrated by a process of integration or summing. This summing of the DPF service age $\rho$ and this step also keeps track of the time between regenerations $\Psi$. At step 104, a decision is made as to whether DPF 20 requires a regeneration. This may be decided upon the delta pressure across DPF 20 as sensed by sensors 34 and 36 under the control of controller 32 and upon other portions of method 100, such as the compensation for the ash loading that is occurring in DPF 20. With the ash loading prediction being made by the present invention, then the contribution of backpressure in DPF 20 that is attributed to the particulate matter that is to be cleaned from DPF 20 can be accurately assessed to determine if it is time for a regeneration of DPF 20 to take place. If no regeneration is needed, step 104 proceeds back to step 102 but the time continues to be tracked for the DPF service age $\rho$ and the time between regenerations $\Psi$. If a DPF regeneration needs to take place as decided at step 104, method 100 proceeds to step 106 in which a DPF regeneration cycle is initiated and takes place.

A predetermined minimum DPF age $\tau$, schematically shown as step 108 is used in step 110 to compare to the DPF service age $\rho$ to see if $\rho$ is greater than or equal to $\tau$. If the integrated DPF service age $\rho$ is not greater than or equal to the minimum DPF age $\tau$, then method 100 resets the time between regenerations $\Psi$ to be equal to zero, at step 112, so that it will then start re-accumulating time at step 102. This portion of method of 100 ensures that at least a minimum age for DPF 20 is realized before establishing a service life for DPF 20. In the event that the DPF service age $\rho$ exceeds or is equal to the minimum DPF age $\tau$, method 100 proceeds to step 114 to determine if a maximum average time $\alpha$ has been set. If the answer is no, then the maximum average time is set to the most recent time between regenerations $\Psi$ and $\Psi_{AVG}$ is also set equal to $\Psi$, at step 116. If the maximum average time a has been previously set, then method 100 proceeds from step 114 to step 118 in which the running average of the time between regenerations $\Psi_{AVG}$ is calculated by the equation of $\Psi_{AVG}$ being set equal to $(\Psi_{AVG}+\Psi)/2$. Then at step 120, an end-of-service life ratio $\Lambda$ is set equal to the running average of time between regenerations $\Psi_{AVG}$ divided by the maximum average time $\alpha$ and the time between regenerations $\Psi$ is set to zero. Method 100 then proceeds to step 122, in which it is determined whether the end-of-service life ratio $\Lambda$ is less than or equal to the end-of-service life ratio maximum $\Lambda_L$. If the answer is no, then method 100 proceeds to step 102. If the end-of-service life ratio $\Lambda$ is less than or equal to end-of-service life ratio maximum $\Lambda_L$, then method 100 proceeds to step 126 in which the percent end-of-service life $\mu$ is set using the end-of-service life $\Lambda$ is an input to a two-dimensional lookup table as illustrated in step 124 where the end-of-service life ratio $\Lambda$ is used to determine the percent end-of-service life $\mu$. Method 100 then proceeds to step 134.

Steps 128, 130, and 132 are carried out as an input to step 134. A DPF delta pressure reading is taken at step 128 by way of sensors 34 and 36 measuring the delta pressure across DPF 20. The DPF delta pressure reading at step 128 is converted to a normalized delta pressure (Norm-DP) at step 130 using equations from Konstandopoulos, et al., which is contained in SAE 2002-01-1015. The output of step 130 is Norm-DP as illustrated in step 132, which serves as an input to step 134. At step 134, the normalized delta pressure adjustment factor $\delta$ is established using Norm-DP and the percent end-of-service life $\mu$ as inputs. Normalized DP adjustment factor table 136 is utilized with Norm-DP and percent end of service life $\mu$ as inputs to a three dimensional lookup table. At step 140, it is determined whether the normalized delta pressure adjustment factor $\delta$ is greater than or equal to the maximum normalized delta pressure adjustment factor $\delta_L$ established at step 138. If the normalized delta pressure adjustment factor $\delta$ is greater than the maximum normalized delta pressure adjustment factor $\delta_L$, then method 100 proceeds to step 142 in which an adjusted normalized DPF delta pressure is calculated using the normalized delta pressure adjustment factor $\delta$ and Norm-DP and then method 100 proceeds back to step 102. If the normalized delta pressure adjustment factor $\delta$ is greater than or equal to the maximum normalized delta pressure adjustment factor $\delta_L$, then method 100 proceeds from step 140 to step 144 in which an indication is made that service or the replacement of the DPF 20 is necessary. The indication may be in the form of an illuminated warning light on a console supervised by an operator or some other form of communication of the information to the operator of vehicle 10 or to maintenance personnel. Additionally, at step 144, when the service or replacement of DPF 20 takes place, variables are set to zero such as $\Psi_{AVG}$, ρ, α, Λ, μ, δ.

DPF 20 may be in the form of a wall-flow filter that traps soot with a very high efficiency, even above 90%. When the soot cake layer has been established within DPF 20, filling the inlet channel walls, the pressure increases across DPF 20 and a soot trapping efficiency of higher than 99% may be achieved. It is common to measure a pressure drop across DPF 20 through the use of a delta pressure sensor, which may include two sensors, such as those illustrated in FIG. 1 as sensors 34 and 36. The readings from sensors 34 and 36 are used to predict DPF 20 soot loading. These predictions can be made with models, such as those developed by Konstandopoulos, et al., (SAE 2002-01-1015). A high filtration efficiency DPF 20 also traps ash, which can come from high ash lube oil, excessive oil consumption, and high ash fuels, such as biodiesel. As ash gradually accumulates in DPF 20, the DPF 20 delta pressure signal received by controller 32 at a given soot level will be higher. This behavior is due to ash occupying space in the inlet channels of DPF 20, leaving less surface/volume for soot distribution.

Overall, ash accumulation is generally a slow process. Total exhaust system back pressure due to ash starts to become noticeable above 2,500 hours of engine operation for greater than 130 kilowatt applications, and above 1,500 hours of operation for less than 130 kilowatt applications. However, in addition to the effect on engine performance due to higher back pressure, the delta pressure sensor readings increase as a result of the ash loading. Without any compensation for ash loading, the time interval between regenerations starts to decrease since the aftertreatment control system will determine that a DPF 20 regeneration needs to occur based on delta pressure readings.

It is known that ash loading of DPF 20 will cause higher delta pressure readings across DPF 20 to become progressively higher with soot loading and that such effects cannot be remedied by merely averaging. Also, ash accumulation can take a significant amount of engine operation time to show substantial effects on DPF delta pressure signals and exhaust back pressures.

Method 100 deals with ash that is accumulated in DPF 20 with time, and recognizes the normalized delta pressure readings will tend to increase, leading to more frequent regenerations. The increase in the number of regenerations can be tied in direct proportion to the overall average time between regenerations. The maximum average time α is calculated early on in engine and aftertreatment service life. Although it can be calculated from the first several samples of time between regenerations, waiting for DPF age ρ to pass a minimum DPF age τ allows there to be ample time for the maximum average time α to be established and thereby avoid a possible over calculation of the maximum average time between regenerations.

After the maximum average time α is calculated, it will be continuously referenced to calculate the end-of-service life ratio Λ using the ongoing calculation of the running average of time between regenerations $\Psi_{AVG}$. As DPF 20 loads with ash and the regeneration frequency increases, Λ decreases from 1.0. However, as ash accumulates in DPF 20, the normalized and non-normalized delta pressure will trend at higher levels for the same soot loading than if there was no ash present in DPF 20.

From experimental testing, it has been found that the end-of-service life ratio Λ can be used as an input to a percentage end-of-service life μ lookup table. The percent end-of-service life μ is then used as an input to a three-dimensional table to calculate the normalized DPF 20 delta pressure adjustment factor δ to compensate for the ash loading effect on the normalized DPF delta pressure calculation. The other input to the three-dimensional table is the normalized DPF delta pressure Norm-DP, which is derived using a measured DPF delta pressure and the equations from Konstandopoulos, et al. As ash continues to accumulate, the necessary compensation for the normalized DPF delta pressure will increase in order to accurately measure DPF 20 soot loading. Once the normalized delta pressure adjustment factor δ exceeds a maximum normalized delta pressure adjustment factor $\delta_L$, DPF 20 will reach the end-of-service life.

Advantageously, the present invention provides a statistically based ash model to monitor and verify the ash prediction that is not based on operation hours or fuel consumption history, as utilized in prior art systems. Further, the method is also capable of flagging excessive oil consumption or poor fuel quality that results in excessive loading of DPF 20. Additionally, the present invention reduces the number of DPF regenerations when the DPF 20 is approaching the end-of-service life. The method can also generate an input for a monitor after determining that an ash service warning or engine degradation is occurring or may occur. Yet further, the present invention can compensate for the use of biodiesel, which has a tendency to create additional ash over petroleum based diesel.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A particulate filter ash loading prediction method, comprising the steps of:

determining a maximum average time for the particulate filter;

performing a calculation of a running average of time between regenerations of the particulate filter;

calculating an end-of-service-life ratio of the particulate filter dependent upon said maximum average time and said running average;

determining a delta pressure adjustment factor to compensate for ash loading of the particulate filter dependent upon said end-of-service-life ratio; and comparing said delta pressure adjustment factor to a predetermined maximum normalized delta pressure adjustment factor, if said delta pressure adjustment factor exceeds said predetermined maximum normalized delta pressure adjustment factor then indicating that at least one of service and replacement of the particulate filter is needed due to ash loading.

2. The ash loading prediction method of claim 1, further comprising a step of regenerating the particulate filter dependent upon a delta pressure measurement across the particulate filter.

3. The ash loading prediction method of claim 1, further comprising the step of using said end-of-service-life ratio as an input to a look-up table to set a percent end-of-service-life value used in the determining a delta pressure adjustment factor step.

4. The ash loading prediction method of claim 1, wherein if said delta pressure adjustment factor does not exceed said predetermined maximum normalized delta pressure adjustment factor then adjusting the normalized delta pressure using said delta pressure adjustment factor and the normalized delta pressure.

5. The ash loading prediction method of claim 4, wherein said normalized delta pressure is calculated using equations from SAE 2002-01-1015 and a delta pressure reading across the particulate filter.

6. The ash loading prediction method of claim 5, further comprising a step of regenerating the particulate filter dependent upon said delta pressure measurement across the particulate filter.

7. The ash loading prediction method of claim 1, wherein said determining a delta pressure adjustment factor further includes using a normalized delta pressure value derived from a calculation that uses a filter delta pressure measurement as an input.

8. The ash loading prediction method of claim 7, further comprising the step of adjusting said normalized delta pressure using said delta pressure adjustment factor and said normalized delta pressure.

9. The ash loading prediction method of claim 8, further comprising a step of delaying the determining of said maximum average time until after the particulate filter has experienced a predetermined minimum time of use.

10. The ash loading prediction method of claim 9, further comprising the step of integrating a time between filter regenerations.

11. A vehicle, comprising:

an internal combustion engine;

a particulate filter connected to said internal combustion engine;

a controller operatively connected to said internal combustion engine and to said particulate filter, said controller being configured to execute the steps of a method, the method including the steps of:

determining a maximum average time for the particulate filter;

performing a calculation of a running average of time between regenerations of the particulate filter;

calculating an end-of-service-life ratio of the particulate filter dependent upon said maximum average time and said running average;

determining a delta pressure adjustment factor to compensate for ash loading of the particulate filter dependent upon said end-of-service-life ratio; and comparing said delta pressure adjustment factor to a predetermined maximum normalized delta pressure adjustment factor, if said delta pressure adjustment factor exceeds said predetermined maximum normalized delta pressure adjustment factor then indicating that at least one of service and replacement of the particulate filter is needed due to ash loading.

12. The vehicle of claim 11, wherein the method further includes a step of regenerating the particulate filter dependent upon a delta pressure measurement across the particulate filter.

13. The vehicle of claim 11, wherein the method further includes the step of using said end-of-service-life ratio as an input to a look-up table to set a percent end-of-service-life value used in the determining a delta pressure adjustment factor step.

14. The vehicle of claim 11, wherein if said delta pressure adjustment factor does not exceed said predetermined maximum normalized delta pressure adjustment factor then adjusting the normalized delta pressure using said delta pressure adjustment factor and the normalized delta pressure.

15. The vehicle of claim 14, wherein said normalized delta pressure is calculated using equations from SAE 2002-01-1015 and a delta pressure reading across the particulate filter.

16. The vehicle of claim 15, wherein the method further includes a step of regenerating the particulate filter dependent upon said delta pressure measurement across the particulate filter.

17. The vehicle of claim 11, wherein said determining a delta pressure adjustment factor further includes using a normalized delta pressure value derived from a calculation that uses a filter delta pressure measurement as an input.

18. The vehicle of claim 17, wherein the method further includes the step of adjusting said normalized delta pressure using said delta pressure adjustment factor and said normalized delta pressure.

19. The vehicle of claim 18, wherein the method further includes a step of delaying the determining of said maximum average time until after the particulate filter has experienced a predetermined minimum time of use.

20. The vehicle of claim 19, wherein the method further includes the step of integrating a time between filter regenerations.

* * * * *